No. 663,435.  
G. S. HEATH.  
ROLLER BEARING.  
(Application filed Jan. 10, 1898. Renewed May 14, 1900.)

(No Model.)

Patented Dec. 11, 1900.

WITNESSES  
INVENTOR  
George S. Heath  
by Chas. H. Howe  
his atty

UNITED STATES PATENT OFFICE.

GEORGE S. HEATH, OF REVERE, MASSACHUSETTS.

ROLLER-BEARING.

SPECIFICATION forming part of Letters Patent No. 663,435, dated December 11, 1900.

Application filed January 10, 1898. Renewed May 14, 1900. Serial No. 16,691. (No model.)

*To all whom it may concern:*

Be it known that I, GEORGE S. HEATH, a citizen of the United States, residing in Revere, in the county of Middlesex and State of Massachusetts, have invented certain new and useful Improvements in Bearings, of which the following, taken in connection with the accompanying drawings, is a specification.

My invention relates to an improved construction of roller-bearings.

My invention has for its objects, first, the prevention of circumferential contact of the bearing-rollers with one another; second, the prevention of lateral and longitudinal movement of the concentric members with respect to each other, and, third, the reduction of friction and wear.

Figure 1:
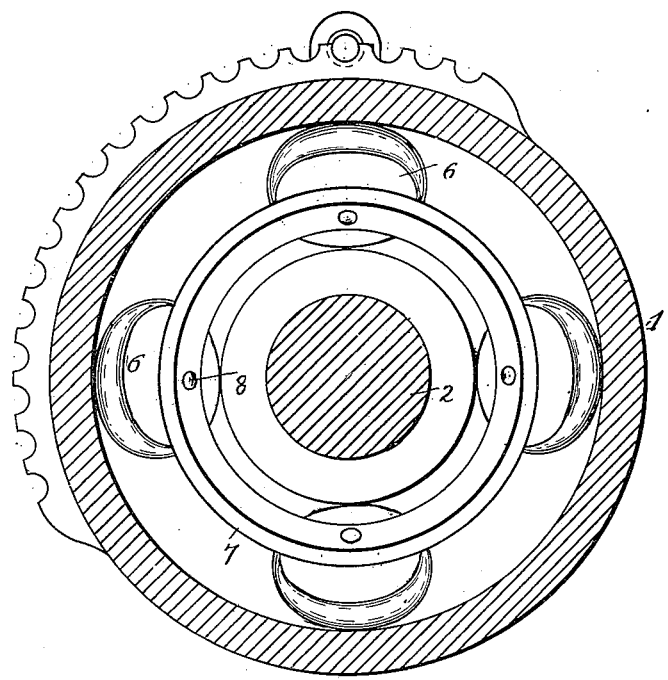
Figure 2:
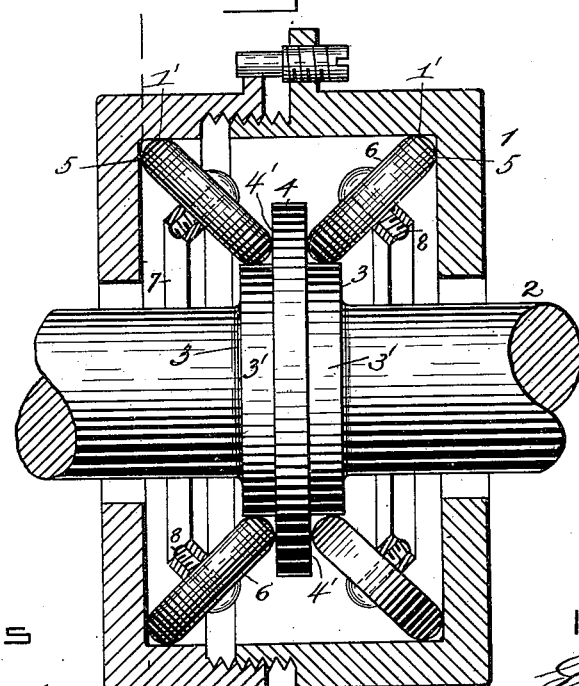

In the accompanying drawings, illustrating an embodiment of my invention, Figure 1 is a plan view, and Fig. 2 is a view partly in section and partly in elevation.

In the drawings like characters designate corresponding parts.

Referring to the drawings, 1 is a hub or case, and 2 is a shaft. Either of these may rotate or both may rotate, according to the kind of machine in which the bearing is used. On the shaft 2 there is a collar or shoulder 3, the object of which is to lessen the distance between the shaft and the hub. The periphery of the shoulder is formed with the straight cylindrical bearing-surfaces 3' 3', and upon this collar or shoulder there is a flange 4, having the plane vertical bearing-surfaces 4' 4'.

The hub or case is in the form of a shell having the plane vertical bearing-surfaces 5 5 and the straight cylindrical bearing-surfaces 1' 1'.

The bearing-rollers are in the form of disks 6, having rounded peripheries or bearing-surfaces, and are made of hard metal or other suitable material. The rollers are supported so that they rotate in planes at an angle to the plane of rotation of the concentric members and bear between the angles formed by the plane surfaces 4' 4' of flange 4 and the straight cylindrical surfaces 3' 3' of the shoulder and those formed by the similar surfaces 5 5 and 1' 1' of the hub or case, thus greatly reducing the area of contact between the parts, and thereby reducing friction and wear. The rollers are also supported around the shaft or central member, so that they cannot come in contact with one another, by means of rings 7 7. The rollers are pivotally supported on the rings by the arbors 8, on which they turn.

The two sets of rollers, with each set arranged in planes inclined in opposite directions, prevent the lateral as well as longitudinal movement of the parts 1 and 2 with respect to each other.

The bearing is used by me to support a reflector on a machine for utilizing solar heat; but of course it may be used on other machines.

Having thus described my invention, what I claim, and desire to secure by Letters Patent, is—

In a bearing, the combination of a central member 2 having straight cylindrical bearing-surfaces 3' and a flange 4 formed with the plane vertical bearing-surfaces 4', the hub or case 1 having the straight cylindrical bearing-surfaces 1' and the plane vertical bearing-surfaces 5', disk rollers 6 arranged angularly between the members or parts 1 and 2 and having rounded peripheries or bearing-surfaces to engage surfaces 1', 5', and 3' and 4', and rings 7 for holding the rollers apart, all arranged and operating substantially as shown and described.

In testimony whereof I have hereunto subscribed my name this 4th day of January, A. D. 1898.

GEORGE S. HEATH.

Witnesses:
ALEX. L. HAYES,
MARY L. LAWRENCE.